(12) United States Patent
Ozu et al.

(10) Patent No.: US 10,605,492 B2
(45) Date of Patent: Mar. 31, 2020

(54) REFRIGERATION CYCLE DEVICE

(71) Applicant: Guangdong Meizhi Compressor Co., Ltd., Foshan (CN)

(72) Inventors: Masao Ozu, Foshan (CN); Weimin Xiang, Foshan (CN); Jijiang Yu, Foshan (CN); Hong Guo, Foshan (CN); Cheng Zhang, Foshan (CN); Ziqiang Liang, Foshan (CN); Ling Wang, Foshan (CN); Liang Zhong, Foshan (CN); Lili Yan, Foshan (CN)

(73) Assignee: Guangdong Meizhi Compressor Co., Ltd., Foshan (CN)

( * ) Notice: Subject to any disclaimer, the term of this patent is extended or adjusted under 35 U.S.C. 154(b) by 0 days.

(21) Appl. No.: 15/511,544

(22) PCT Filed: Jun. 16, 2015

(86) PCT No.: PCT/CN2015/081564
§ 371 (c)(1),
(2) Date: Mar. 15, 2017

(87) PCT Pub. No.: WO2016/201623
PCT Pub. Date: Dec. 22, 2016

(65) Prior Publication Data
US 2017/0284706 A1 Oct. 5, 2017

(51) Int. Cl.
*F25B 1/10* (2006.01)
*F25B 5/00* (2006.01)
(Continued)

(52) U.S. Cl.
CPC .............. *F25B 1/10* (2013.01); *F25B 1/047* (2013.01); *F25B 5/00* (2013.01); *F25B 31/002* (2013.01);
(Continued)

(58) Field of Classification Search
CPC ...... F25B 31/002; F25B 31/004; F25B 43/02; F25B 43/006
See application file for complete search history.

(56) References Cited

U.S. PATENT DOCUMENTS

| 5,236,311 A | 8/1993 | Lindstrom |
| 6,089,834 A * | 7/2000 | Ozu ........................ H02K 7/14 417/356 |

(Continued)

FOREIGN PATENT DOCUMENTS

| CN | 101180505 A | 5/2008 |
| CN | 104930738 A | 9/2015 |

(Continued)

OTHER PUBLICATIONS

PCT/CN2015/081564 International Search Report & Written Opinion dated Mar. 10, 2016, 14 pages.
(Continued)

*Primary Examiner* — Christopher R Zerphey
(74) *Attorney, Agent, or Firm* — Scully Scott Murphy & Presser

(57) ABSTRACT

A refrigeration cycle device includes at least a condenser, an expansion valve, an evaporator and a plurality of compressors, a sealed casing of each of the compressors is disposed with a rotary compression mechanism part in communication with a low-pressure path and a motor part configured to drive the compression mechanism part, the low-pressure path is in communication with the evaporator, each of the compressors is further provided with an oil storage cavity, and a gas discharge path of at least one compressor is connected with the sealed casing of another compressor.

9 Claims, 5 Drawing Sheets

(51) Int. Cl.
  *F25B 41/06* (2006.01)
  *F25B 31/02* (2006.01)
  *F25B 43/02* (2006.01)
  *F25B 31/00* (2006.01)
  *F25B 1/047* (2006.01)
  *F25B 41/04* (2006.01)

(52) U.S. Cl.
  CPC .......... *F25B 31/004* (2013.01); *F25B 31/026* (2013.01); *F25B 41/043* (2013.01); *F25B 41/062* (2013.01); *F25B 43/02* (2013.01); *F25B 2400/075* (2013.01); *F25B 2400/0751* (2013.01); *F25B 2500/16* (2013.01); *F25B 2600/0253* (2013.01)

(56) References Cited

U.S. PATENT DOCUMENTS

| | | | | |
|---|---|---|---|---|
| 6,637,216 | B1* | 10/2003 | Narney, II | F04C 23/008 417/357 |
| 6,748,754 | B2* | 6/2004 | Matsumoto | F04C 23/001 62/175 |
| 8,109,116 | B2* | 2/2012 | Sekiya | F01C 1/0223 62/192 |
| 8,826,691 | B2* | 9/2014 | Yoon | F25B 31/004 62/196.1 |
| 2003/0230098 | A1* | 12/2003 | Moon | F25B 1/10 62/175 |
| 2006/0123834 | A1 | 6/2006 | Hwang et al. | |
| 2007/0033954 | A1* | 2/2007 | Jang | F25B 49/022 62/149 |
| 2017/0089624 | A1* | 3/2017 | Yokoyama | F04B 39/0246 |

FOREIGN PATENT DOCUMENTS

| | | |
|---|---|---|
| CN | 204787380 U | 11/2015 |
| JP | 57139680 U1 | 2/1981 |
| JP | S57139680 U | 9/1982 |
| JP | H02227570 A | 9/1990 |
| JP | H0526183 A | 2/1993 |
| JP | 2001074319 A | 3/2001 |
| JP | 2001324230 A | 11/2001 |
| JP | 2004020179 A | 1/2004 |
| JP | 2004093074 A | 3/2004 |
| WO | WO 2008111712 A2 | 9/2008 |

OTHER PUBLICATIONS

Chinese Patent Application No. 201510334626.0, English translation of the First Office Action dated Nov. 4, 2016, 8 pages.
Chinese Patent Application No. 201510334626.0, English translation of the Second Office Action dated May 12, 2017, 8 pages.
Chinese Patent Application No. 201510334626.0, English translation of the First Office Action dated Nov. 4, 2016, 11 pages.
Chinese Patent Application No. 201510334626.0, English translation of the Second Office Action dated May 12, 2017, 11 pages.
Japanese Patent Application No. JP2017533673 Office Action dated Mar. 13, 2018, 9 pages.
Japanese Patent Application No. JP2017533673 English translation of Office Action dated Mar. 13, 2018, 7 pages.
European Patent Application No. 15895196.2 extended Search and Opinion dated Jan. 3, 2019, 11pages.
Examination Report dated Aug. 8, 2019 received in Indian Patent Application No. IN 201737005831 together with an English language translation.

\* cited by examiner

REFRIGERATION CYCLE DEVICE

FIELD

The present disclosure relates to a field of refrigeration, and more particularly to a refrigeration cycle device.

BACKGROUND

For multi-connected air conditioner including a plurality of compressors and a plurality of evaporators provided in rooms, the compressor starts or stops repeatedly because of variation of the air-conditioner load, the amount of oil in each of the compressor increases or decreases, and a large amount of refrigerant condenses when the compressor stops and at the low temperature. The compressor with a decreasing amount of oil easily goes wrong, and due to condensation of the refrigerant in the compressor, and not only a refrigeration cycle performance is reduced, in addition, a large amount of oil is also discharged when the compressor starts again.

In the present multi-connected air conditioner system, a plurality of the compressors are connected in the refrigeration cycle in parallel, and a method of the oil discharged by the compressor being recycled into an oil separator and returning to the low-pressure path, as well as a method of managing the amount of oil in the compressor by means of an oil level sensor and giving and receiving lubricating oil when necessary are spread in some extent. The management and control of the refrigeration cycle are complicated, and further problem of a low efficiency of the refrigeration cycle exists.

SUMMARY

The present disclosure is intended to solve one of the technical problems in the related art to at least some extent. Thus, a refrigeration cycle device is provided in the present disclosure, the compressor in operation has a decreased oil drain amount in a refrigeration cycle, and an active refrigerant amount is stable in the refrigeration cycle.

The refrigeration cycle device according to embodiments of the present disclosure includes at least a condenser, an expansion valve, an evaporator and a plurality of compressors, a sealed casing of each of the compressors is provided with a rotary compression mechanism part in communication with a low-pressure path and a motor part configured to drive the compression mechanism part, the low-pressure path is in communication with the evaporator, each of the compressors is further provided with an oil storage cavity, and a gas discharge path of at least one compressor is connected with the sealed casing of another compressor.

With the refrigeration cycle device according to embodiments of the present disclosure, by connecting the gas discharge path of one compressor with the sealed casing of another compressor, the stopped compressor acts as an oil separator of the operating compressor, and the amount of oil discharge from the operating compressor in the refrigeration cycle has been reduced. Meanwhile, a usually suitable amount of oil can be retained in each of the compressors. Furthermore, as the operating compressor outputs the refrigerant, the stopped compressor is heated, and the refrigerant in the stopped compressor does not condense, therefore the compressor turns quickly from an unstable operation to an stable operation when the pre-heated stopped compressor starts, thus a start time of the refrigeration cycle device can be shortened and there is no liquid refrigerant in the stopped compressor, as which the amount of active refrigerant in the refrigeration cycle is stable.

In some specific embodiments of the present disclosure, for any two selected compressors of the plurality of compressors, the gas discharge path of one compressor is connected with the sealed casing of the other compressor, and a gas discharge pipe of the other compressor is connected with the condenser; or for any three selected compressors of the plurality of compressors, the gas discharge path of a first compressor is connected with the sealed casing of a second compressor, the gas discharge path of the second compressor is connected with the sealed casing of a third compressor, and the gas discharge pipe of the third compressor is connected with the condenser.

Further, the sealed casing of the first compressor is in communication with the oil storage cavity of the second compressor or the oil storage cavity of the third compressor.

In specific embodiments of the present disclosure, an oil separator provided in the refrigeration cycle device is connected with the low-pressure path or the sealed casing of the first compressor.

According to some preferable embodiments of the present disclosure, a collective type accumulator is disposed between the evaporator and the low-pressure path.

In specific embodiments of the present disclosure, in the low-pressure path connecting the compression mechanism part and the evaporator, a one-way valve or a solenoid valve configured to avoid a refrigerant flow from the compression mechanism part to the evaporator is provided.

According to some embodiments of the present disclosure, the motor part includes at least a stator core, a rotor core and a motor coil provided in the stator core, an open end of the gas discharge path of the one compressor is open towards a region surrounded by the sealed casing, the compression mechanism part and the stator core of the other compressor.

Preferably, the first compressor starts firstly.

Specifically, at least one motor part is configured to be a variable-rotation-speed and variable-frequency motor part.

In some embodiments of the present disclosure, for any two or three selected compressors of the plurality of compressors, the motor part of one compressor is configured to be a variable-rotation-speed and variable-frequency motor part, and the compression mechanism part of one or two compressors is configured to be a variable-capacity compression mechanism part with two-stage variable refrigeration-capacity.

Further, an increase-decrease slope of a refrigerating capacity, within a range from a minimum refrigerating capacity to a maximum refrigerating capacity obtained from a combination of the two or three compressors, is of a substantial straight line shape.

Optionally, a plurality of the expansion valves and a plurality of the evaporators are provided respectively.

Optionally, the compression mechanism part is configured to be rotary type or scroll type.

Figure 1:
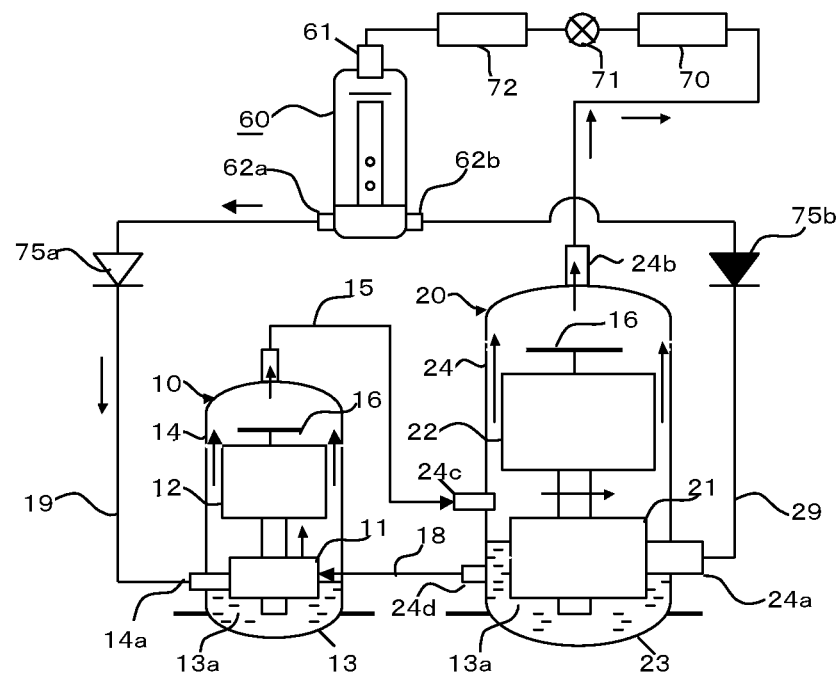
FIG. 1 is concerned with a first embodiment of the present disclosure and represents a refrigeration cycle device.

REFERENCE NUMERALS rotary compressor 10 (20, 30), casing 14 (24), compression mechanism part 11 (21), motor part 12 (22), oil storage cavity 13 (23, 33), lubricating oil 13a, oil separation plate 16, oil discharge pipe 24d, oil feeding pipe 18(28,74), gas discharge path 15, gas discharge pipe 24b (34b), suction pipe of cylinder 14a (24a), low-pressure path 19 (29), gas discharge path 25, connection pipe 34c, oil discharge pipe 34d, condenser 70, expansion valve 71, evaporator 72, one-way valve 75a (75b), connection pipe 24c, oil separator 77, collective type accumulator 60, low-pressure gas discharge pipe 62a (62b), low-pressure suction pipe 61, middle baffle plate 602c, liquid refrigerant chamber 64, flow-distribution chamber 63, central pipe 60b, oil hole 60d, scroll compressor 110 (120).

DETAILED DESCRIPTION

Embodiments of the present disclosure will be described in detail in the following. Examples of the embodiments are shown in the drawings. The embodiments described with reference to the drawings are illustrative, which are only used to explain the present disclosure and shouldn't be construed to limit the present disclosure.

In the specification, it should be understood that terms such as "central", "longitudinal", "lateral", "length", "width", "depth", "upper", "lower", "front", "rear", "left", "right", "vertical", "horizontal", "top", "bottom", "inner", "outer", "clockwise", "counterclockwise", "axial direction", "radial direction" and "circumferential direction" should be construed to refer to the orientation as then described or as shown in the drawings under discussion. These relative terms are only for convenience of description and do not indicate or imply that the device or element must be in the particular orientation, be constructed or operated in a particular orientation, therefore can't be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means at least two, such as two or three, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections or be able to communicate with each other; may also be direct connections or indirect connections via intervening structures; may also be inner communications or interaction relationship of two elements, unless limited otherwise, which can be understood by those skilled in the art according to specific situations.

A refrigeration cycle device according to embodiments of the present disclosure will be described in detail in the following with reference to FIG. 1 to FIG. 9.

The refrigeration cycle device according to embodiments of the present disclosure includes at least a condenser, an expansion valve, an evaporator and a plurality of compressors, a sealed casing of each of the compressors is provided with a rotary compression mechanism part in communication with a low-pressure path and a motor part configured to drive the compression mechanism part, the low-pressure path is in communication with the evaporator, each of the compressor is further provided with an oil storage cavity. That is, each of the compressors includes the sealed casing (i.e. the casing described below), the compression mechanism part and the motor part. The compression mechanism part and the motor part are disposed within the sealed casing, and a bottom of the sealed casing is provided with the oil storage cavity, the compression mechanism part is connected with the evaporator through the low-pressure path, and the motor part is used to drive the compression mechanism part.

Optionally, the compression mechanism part may be configured to be a rotary compression mechanism or scroll compression mechanism. Specifically, a plurality of expansion valves and a plurality of evaporators are provided respectively. That is, the plurality of expansion valves and the plurality of evaporators may be included, and one evaporator and one expansion valve are disposed in each room correspondingly, namely the refrigeration cycle device can perform temperature adjustment for a plurality of rooms.

A gas discharge path of at least one compressor is connected with the sealed casing of another compressor. For example, as shown in FIG. 1, FIG. 3, FIG. 6 and FIG. 9, for any two selected compressors of the plurality of compressors, the gas discharge path of one compressor is connected with the sealed casing of the other compressor, and a gas discharge pipe of the other compressor is connected with the condenser.

Figure 4:
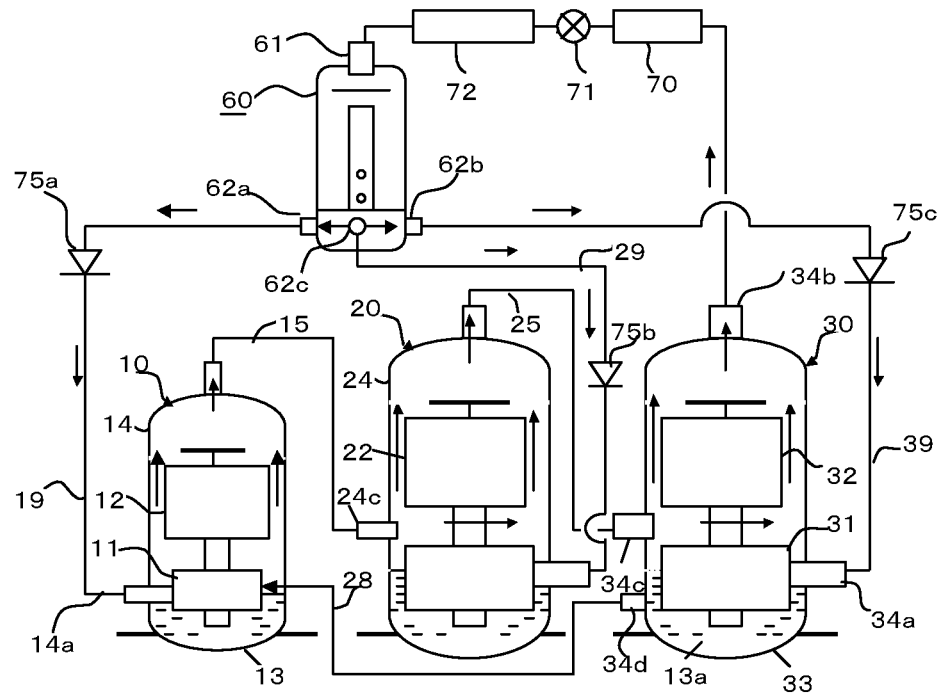
FIG. 4 is concerned with a second embodiment of the present disclosure and represents a refrigeration cycle device.
Figure 5:
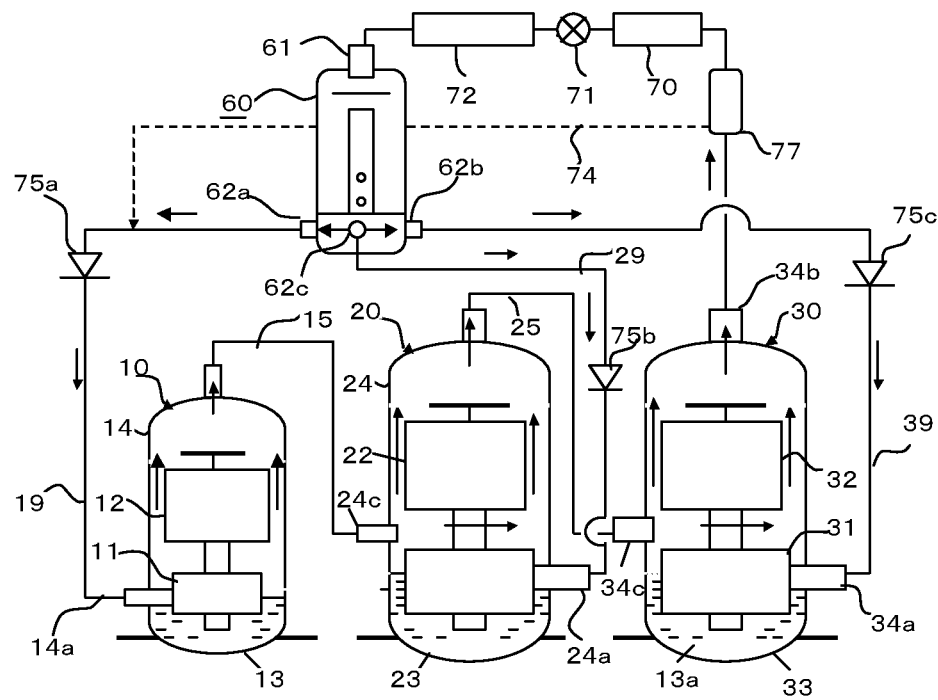
FIG. 5 is concerned with the second embodiment and represents the refrigeration cycle device having an oil separator.

Or as shown in FIG. 4 and FIG. 5, for any three selected compressors of the plurality of compressors, the gas discharge path of a first compressor is connected with the sealed casing of a second compressor, the gas discharge path of the second compressor is connected with the sealed casing of a third compressor, and the gas discharge pipe of the third compressor is connected with the condenser.

Certainly, it should be understood that, the number of compressors selected from the plurality of compressors is not limited thereto, and may be four or more than four.

In other words, N compressors may be selected from the plurality of compressors, and the gas discharge path of the first compressor is connected with the sealed casing of the second compressor, by analogy, the gas discharge path of the (N-1)th compressor is connected with the sealed casing of the Nth compressor, and the gas discharge pipe of the N compressor is connected with the condenser, in which N is equal to or larger than 2. It should be understood that, some of the compressors of the N compressors may operate, with some other compressors in a stopped state.

Thus, when the (N-1)th compressor operates and the Nth compressor stops, the high-pressure refrigerant in the (N-1)th compressor flows into the Nth compressor to join in the cycle, the stopped compressor acts as an oil separator for the operating compressor, and the operating compressor drain can less oil to the refrigeration cycle.

With the refrigeration cycle device according to embodiments of the present disclosure, by connecting the gas discharge path of one compressor with the sealed casing of another compressor, the stopped compressor acts as an oil separator of the operating compressor, and the operating compressor drain can less oil to the refrigeration cycle. Meanwhile, a usually suitable amount of oil can be retained in each of the compressors. Furthermore, as the operating compressor outputs the refrigerant, the stopped compressor is heated, and the refrigerant in the stopped compressor does not condense, therefore the compressor turns quickly from an unstable operation to an stable operation when the pre-heated and stopped compressor starts, thus a start time of the refrigeration cycle device can be shortened and there is no liquid refrigerant in the stopped compressor, so that the amount of active refrigerant in the refrigeration cycle is stable.

In some embodiments of the present disclosure, the sealed casing of the first compressor is in communication with the oil storage cavity of the second compressor or the third compressor, so that the second compressor or the third compressor can be used to supplement oil for the first compressor, and as there is a small pressure difference, the oil supplement is easy.

According to some embodiments of the present disclosure, an oil separator 77 provided in the refrigeration cycle device is connected with the low-pressure path or the sealed casing of the first compressor, so that the oil stored in the oil separator 77 can return to the first compressor for recycle.

According to some optional embodiments of the present disclosure, a collective type accumulator 60 is disposed between the evaporator and the low-pressure path. By means of the collective type accumulator 60, an excess refrigerant is ensured in the collective type accumulator 60 and can be reserved for starting the compressor next time. Compared with a usually stopped single type accumulator, a volume of the collective type accumulator 60 may be reduced. That is, there is no liquid refrigerant left in the stopped accumulator, so the amount of active refrigerant in the refrigeration cycle is usually suitable, and the amount of sealed refrigerant for the refrigeration cycle can be reduced. The distributed flow of the refrigerant and the oil in the operated compressor is equalized.

In some embodiments of the present disclosure, in the low-pressure path connecting the compression mechanism part with the evaporator, a one-way valve or a solenoid valve configured to avoid a refrigerant flow from the compression mechanism part to the evaporator is provided.

In some specific embodiments of the present disclosure, the motor part includes at least a stator core, a rotor core and a motor coil provided in the stator core, an open end of the gas discharge path of the one compressor is open towards a region surrounded by the sealed casing, the compression mechanism part and the stator core of the other one compressor, thus the oil separation effect is improved.

In an embodiment, the first compressor starts firstly.

In an embodiment, at least one motor part is configured to be a variable-rotation-speed and variable-frequency motor part.

According to specific embodiments of the present disclosure, for any two or three selected compressors of the plurality of compressors, the motor part of one compressor is configured to be a variable-frequency motor with a variable rotation speed, and the compression mechanism part of one or two compressor mechanism part is configured to be a variable-capacity compression mechanism part with a variable two-grade refrigerating capacity.

Further, an increase-decrease slope of a refrigerating capacity, within a range from a minimum refrigerating capacity to a maximum refrigerating capacity obtained from a combination of the two or three compressors, is a substantial straight line in shape.

A refrigeration cycle device according to several specific embodiments of the present disclosure will be described in detail in the following with reference to FIG. 1 to FIG. 9.

The First Embodiment

In the refrigeration cycle shown in FIG. 1, a compression mechanism part 11 and a motor part 12 are accommodated within a casing 14 of a rotary compressor 10. Meanwhile, a compression mechanism part 21 and a motor part 22 are accommodated within a casing 24 of a rotary compressor 20. In addition, the compressors are further provided with an oil storage cavity 13 and an oil storage cavity 23 located at a bottom port of the casing respectively, in which necessary lubricating oil 13a (referred to as oil 13a hereinafter) is stored.

Generally, the oil storage cavity of the rotary compressor is located in a range from a height of a central part of each compression mechanism part to the bottom part of each of the casing. However, the oil level usually fluctuates during operation, especially when the compressor stares at a low temperature, a large amount of oil and a large amount of condensed refrigerant are discharged into the condenser together, so the oil level and the amount of oil in the oil storage cavity will decrease greatly.

An oil separation plate 16 rotating with a rotor of the motor part separates the atomized oil mixed with the discharged refrigerant in the compression mechanism part 11, and the oil falls into the oil storage cavity 13. An oil discharge pipe 24d opens towards the oil storage cavity 23 of the rotary compressor 20 is connected to the rotary compressor 10 through the oil feeding pipe 18. The oil feeding pipe 18 is a means for excess oil 13a in the oil storage cavity 23 to return to the rotary compressor 10.

A gas discharge path 15 of the rotary compressor 10 is connected to a side face of the casing 24 of the rotary compressor 20. Further, the gas discharge pipe 24b of the rotary compressor 20 is connected with an inlet of a condenser 70 forming the refrigeration cycle. On the other hand, an suction pipe 14a of a cylinder of the rotary compressor 10 and a suction pipe 24a of a cylinder of the rotary compressor 20 are connected with a low-pressure gas discharge pipe 62a and a low-pressure gas discharge pipe 62b of a collective type accumulator 60 through a low-pressure path 19 and a low-pressure path 29 respectively.

The condenser 70 connected with the gas discharge pipe 24b is connected with the expansion valve 71 and the evaporator 72 in sequence, and a low-pressure outlet of the evaporator 72 is connected with a low-pressure suction pipe 61 provided in the upper end of the collective type accumulator 60. In addition, a one-way valve 75a and a one-way valve 75b are disposed in the low-pressure path 19 and the low-pressure path 29 respectively, it is only possible that the low-pressure refrigerant flows from the collective type accumulator 60 to the compression mechanism part 11 and the compression mechanism part 21. In addition, the one-way valve may also be a solenoid valve. In this way the refrigeration cycle of the sealed refrigerant is finished.

The expansion valve 71 and the evaporator 72 in a multi-connected air conditioner for air conditioning in a plurality of rooms or in a refrigeration device for a plurality of rooms are larger in number. All of the low-pressure refrigerants evaporated in the evaporator 72 and in different degrees of superheat are concentrated in the collective type accumulator 60 and mixed. In addition, four-way valves arranged in an air conditioner both for heat and refrigeration or defrosting are omitted in the refrigeration cycle diagram in FIG. 1 and the refrigeration cycle is simplified.

Figure 2:
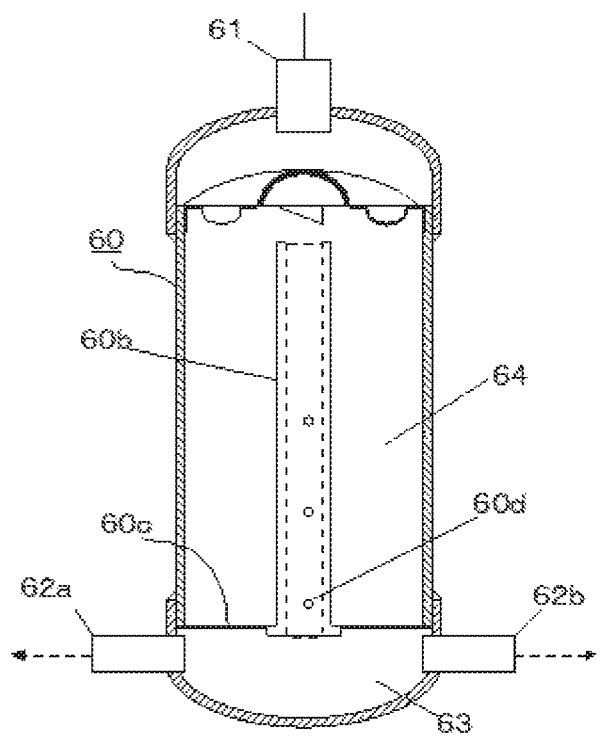
FIG. 2 is concerned with the first embodiment and represents a sectional view of a collective type accumulator.

In the collective type accumulator 60 shown in FIG. 2, a low-pressure suction pipe 61 in the upper end is connected with the outlet of the evaporator 72. The middle baffle plate 60c separates a liquid refrigerant chamber 64 storing the liquid refrigerant and a flow-distribution chamber 63 storing the gaseous refrigerant. The low-pressure gas discharge pipe 62a and the low-pressure gas discharge pipe 62b are provided in the flow-distribution chamber 63. A central pipe 60b fixed in the center of the middle baffle plate 60c is provided with a plurality of oil holes 60d. In addition, a number of the low-pressure gas discharge pipe described above is determined by the number of the compressor.

The rotary compressor 10 in FIG. 1 is in operation and the rotary compressor 20 stops, so the one-way valve 75a is open and the one-way valve 75b is closed. The low-pressure refrigerant sucked from the suction pipe 14a of a cylinder is compressed to be a high-pressure refrigerant in the compression mechanism part 11, and the high-pressure refrigerant is discharged towards the position between the compression mechanism part 11 and the motor part 12. The percentage of oil in refrigerant discharged from the compression mechanism part 11 is usually several in the stable operation.

On the other hand, during the stable operation, the amount of oil mixed in the sucked refrigerant in a cycle in the refrigeration system is usually less than 1%. If the rotary compressor 10 sucks the low-pressure refrigerant containing 1% of oil from the low-pressure path 19, 2 to 3% of oil will be added in a compression cavity of the compression mechanism part 11.

This is a feature of the rotary compressor in which an inner pressure of the casing is a high-pressure side. That is, through a pressure difference between the oil storage cavity 13 having the same pressure with the casing 14 and a compression cavity (not shown) having a lower pressure than the casing 14, the oil 13a in the oil storage cavity 13 is fed into the compression cavity, which can prevent the high-pressure refrigerant from leaking from such as a sliding gap of a piston and also lubricate the sliding face.

When the mixed refrigerant including several percentages of oil discharged to the upper side of the compression mechanism part 11 passes the motor part 12, due to a contact with the motor coil at a high temperature or the oil separation plate 16, the oil is separated. The separated oil falls into the oil storage cavity 13. Such as 0.8% of oil which cannot be separated from the refrigerant is discharged from the connection pipe 24c through the gas discharge path 15, and discharged towards a position between the compression mechanism part 21 and the motor part 22 of the rotary compressor 20.

The connection pipe 24c is most suitably located in a region higher than a gas discharge hole provided in an upper end of the compression mechanism part 21 and lower than the stator core included in the motor part 22. As a result, the mixed refrigerant passes from the lower end to the upper end of the motor part 22, so the oil separation effect is better. In addition, as we all know, if a periphery of the motor coil included in the stator core is open towards the connection pipe 24c, an oil separation efficiency brought by the motor coil can also be improved.

The stopped rotary compressor 20 can play a role as a high effective oil separator because of a casing volume effect and a separation effect of the motor part 22. Thus, with the connection pipe 24c, the oil mixed with the high-pressure refrigerant can be separated and ensured in the oil storage cavity 23.

That is, 0.8%, such as lower to 0.3% or 0.5% of oil mixed with the high-pressure refrigerant and flowing into the rotary compressor 20, is ensured in the oil storage cavity 23. On the other hand, 0.3% of oil together with the high-pressure refrigerant are discharged from the gas discharge pipe 24b to the condenser 70 and become circular oil circulating in the refrigeration device i.e. the cyclical refrigerant contains 0.3% of oil.

On the other hand, the high-pressure refrigerant containing 0.3% of oil is discharged to the condenser 70 through the gas discharge pipe 24b, and then returns to the compression mechanism part 11 through the expansion valve 71 and the evaporator 72, and further through the collective type accumulator 60 and the low-pressure path 19, and that cycle repeats. Because of that cycle, the stopped rotary compressor 20 is heated to a temperature near that of the rotary compressor 10.

Next, the effect of the one-way valve 75b configured in the low-pressure path 29 is illustrated. When the rotary compressor 10 acts, the inner pressure of the casing 24 is the high-pressure side. There is no air suction valve in the rotary compressor represented by the rotary compressor 20, and the high-pressure refrigerant described above leaks to the suction pipe 24a of a cylinder through the compression cavity of the compression mechanism part 21. Therefore the pressure between the casing 24 and the one-way valve 75b forms the high-pressure side and the one-way valve 75b will be closed to prevent the collective type accumulator 60 from a reverse flow.

When the rotary compressor 10 acts, if the motor part 22 of the rotary compressor 20 is powered on, when the rotary compressor 20 starts, a pressure difference applying on a sliding vane in the compression mechanism part of the rotary compressor 20 is zero, which is the same with a condition of a balanced-pressure start after a long time stop. But, when the volume of the low-pressure path 29 before the one-way valve 75b is too small, the motor part 22 may not able to speed up. It could be solved by adding a silencer before the suction pipe 24a of a cylinder and the one-way valve 75b.

Further, if a configuration of the collective type accumulator 60 is not selected, each connection path connecting the suction pipe 14a of a cylinder, the suction pipe 24a of a cylinder and the evaporator 72 is provided with the one-way valve 75a and the one-way valve 75b. Or as normally, if a single accumulator is disposed to the side face of the casing of the rotary compressor, a connection path connecting the accumulator and the evaporator 72 is provided with the one-way valve described above.

When the rotary compressor 20 starts, the low-pressure path 29 in the high-pressure side decreases in pressure, and the one-way valve 75b is open. Meanwhile, the low-pressure refrigerant through the collective type accumulator 60 is sucked and compressed. Thus, the feature of the present disclosure is that, the stopped rotary compressor 20 shares the pressure in the high-pressure side of the operating rotary compressor 10 and the rotary compressor 20 can start and stop at any time.

The rotary compressor 10 recycles the 0.3% of oil from the refrigerant after one cycle in refrigeration system. However, the amount of oil storing in the rotary compressor 10 decreases in proportion to the running time. On the other hand, the amount of oil storing in the stopped rotary compressor 20 increases. An oil feeding pipe 18 is needed as a solving means. The oil discharge pipe 24d provided in the side face of the casing 24 of the rotary compressor 20 is open towards the oil storage cavity 23. However, the open cannot be located in the lower side of the lowest oil level or the lowest oil amount demanded for restarting the rotary compressor 20.

A pressure difference between the casing of the operated rotary compressor 10 and the casing of the stopped rotary compressor 20 is a piping resistance difference of the gas discharge path 15, which is very small. There are several method for feeding oil to the rotary compressor 10 by means of the oil feeding pipe 18 in the prior art, for example, the oil spray method disclosed in patent literature 1 (U.S. Pat. No. 2,988,267) and patent literature 2 (Publication NO. JP 1999013664). For example, with the method disclosed in the patent literature 1 and the patent literature 2, the oil feeding pipe 18 is in communication with the compression cavity of the rotary compressor 10, and the oil is fed under the pressure difference of the compression cavity.

Further, the oil spray above may further be the popularizing liquid refrigerant spray or gaseous refrigerant spray. In addition, with the oil spray above, although there is a re-expansion loss of the refrigerant dissolved in the oil, but it is very little and can be neglected.

Figure 3:
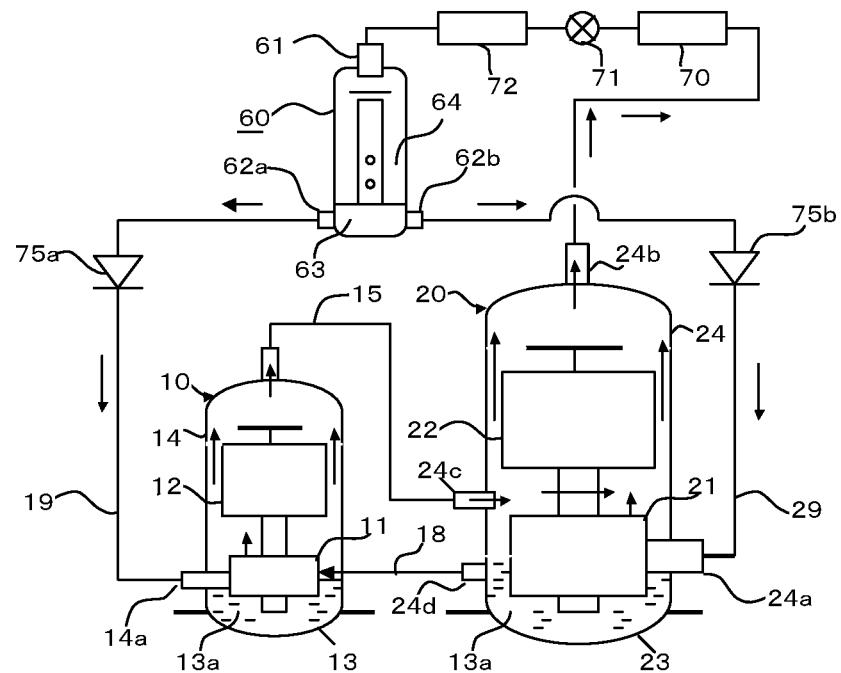
FIG. 3 is concerned with the first embodiment and represents the refrigeration cycle device.

FIG. 3 depicts a state in which the rotary compressor 10 is in operation and the rotary compressor 20 starts. As described above, because of the start, the one-way valve 75b is open, the low-pressure refrigerant flows from the collective type accumulator 60 to the suction pipe 24a of a cylinder. Therefore, the amount of refrigerant circulating in the refrigeration cycle will increase.

With the starting of the rotary compressor 20, the high-pressure refrigerant discharged from the rotary compressor 10 and the high-pressure refrigerant discharged from the compression mechanism part 21 are mixed and flow through the motor part 22. During which the oil included in the mixed refrigerant is separated and ensured in the oil storage cavity 23. The amount of oil is reduced and the high-pressure refrigerant with less than 1% of oil is discharged from the gas discharge pipe 24b to the condenser 70.

The low-pressure refrigerants, evaporated in the plurality of the evaporators 72 and with different superheat degrees are concentrated in the liquid refrigerant chamber 64 of the collective type accumulator 60. Therefore, as the refrigerant mixes, the superheat is equalized. In addition, the oil discharge in the refrigeration cycle constituted from a plurality of heat exchangers will deteriorate a heat exchange efficiency of the heat exchangers. The amount of oil discharge counts less than 1% of circulating refrigerant in the stable refrigeration cycle.

As to the superheat degree, the equalized low-pressure refrigerant and the oil dissolved in the refrigerant do not interfere with each other and flow to the low-pressure gas discharge pipe 62a and the low-pressure gas discharge pipe 62b in the flow-distribution chamber 63 and return to the rotary compressor 10 and the rotary compressor 20 respectively. Thus, the effect of the liquid refrigerant chamber 64 is to equalize the superheat degree of the low-pressure refrigerant. In addition, the flow-distribution chamber 63 can distribute the split-flow amount correctly. Thus the two rotary compressors can exert the best compression efficiency.

During the operation of the rotary compressor 10 and the rotary compressor 20, once only the rotary compressor 10 stops, the high-pressure refrigerant in the casing 14 flow reversely to the low-pressure path 19, so the one-way valve 75a is closed. Therefore, one of the rotary compressor 10 and the rotary compressor 20 can be stopped freely according to the demand. In addition, the stopped rotary compressor can start again.

However, in a combination of the rotary compressor 10 with a small capacity and the rotary compressor 20 with a large capacity, once the refrigeration cycle is stable, the rotary compressor 10 with the small capacity is configured to perform the temperature control of the refrigeration cycle usually, and from a point of an indoor temperature control and APF (Annual Performance Factor), the rotary compressor 10 is also with a high operation efficiency.

In addition, during the operation of the rotary compressor 10, the stopped rotary compressor 20 is heated. Therefore, the rotary compressor 10 starts first, and it also hoped so from a point of preventing the refrigerant in the rotary compressor 20 from condensing. In the first embodiment, the rotary compressor 10 and the rotary compressor 20 are connected through the gas discharge path 15, so the stopped rotary compressor 20 can be heated in advance.

A function and effect of the present embodiment are summarized in the following.

1. In the present embodiment, the gas discharge path 15 of the rotary compressor 10 is connected with the rotary compressor 20 and the high-pressure refrigerant in the rotary compressor 10 circulates in the rotary compressor 20. With this arrangement, (1) the stopped rotary compressor 20 plays a role as a high effective oil separator for the operating rotary compressor 10, therefore, compared with the prior arrangement in which the stopped rotary compressor 20 is not flowed through, the oil discharge of the rotary compressor 10 in the refrigeration cycle is reduced, meanwhile, a usually suitable amount of oil can be remained in each of the rotary compressors;

(3) the rotary compressor 10 and the rotary compressor 20 can stop and restart freely and respectively;

(3) as the rotary compressor 10 discharges the refrigerant, the stopped rotary compressor 20 is heated, and the refrigerant in the rotary compressor 20 does not condense, when the rotary compressor 20 starts, it does not need to worry about that a large amount of liquid refrigerant and oil are discharged;

(4) the rotary compressor 20 in the high-pressure side heated in advance turns more quickly from an unstable operation to an stable operation, thus a start time of an air conditioner can be shortened and no refrigerant condenses in the stopped rotary compressor 20, as which the active refrigerant amount in the refrigeration cycle is stable; and (5) as the pressure difference is small, the oil supplement from the stopped rotary compressor 20 to the operating rotary compressor 10 is easy.

2. With the adoption of the collective type accumulator 60, (1) the excess refrigerant is ensured in the collective type accumulator 60 and can be reserved for starting the compressor next time;

(2) compared with the single accumulator which usually stops, the volume of the collective type accumulator can be reduced, i. e. there is no liquid refrigerant leaves in the accumulator, so the amount of active refrigerant in the refrigeration cycle is usually suitable, and the amount of sealed refrigerant for the refrigeration cycle may be reduced;

(3) outlets of the plurality of the evaporators are concentrated in one collective type accumulator 60, so the different superheat degrees of the low-pressure refrigerants are equalized, therefore, the compression efficiency of the compressor is improved;

(4) the flow distribution of the refrigerant and the oil in the operating compressor is correct; and (5) the arrangement of the one-way valve is easy compared with the prior single accumulator.

3. The multiplying effects of the above 1 and 2 are achieved.

The refrigerant and the lubricating oil in the refrigeration cycle are easy to control, and the refrigeration cycle is excellent in efficiency and reliability.

The Second Embodiment

The second embodiment shown in FIG. 4 is equal to the first embodiment added with the rotary compressor 30, and the refrigeration cycle device is constituted by three compressors totally. Same with the first embodiment, the gas discharge path 25 of the rotary compressor 20 is connected with the connection pipe 34c of the rotary compressor 30. The oil feeding pipe 28 is connected with the oil drain pipe 34d of the rotary compressor 30 and the rotary compressor 10. The three rotary compressors are all in operation.

The high-pressure refrigerant discharged from the rotary compressor 10 gathers with the discharged refrigerant from the rotary compressor 20 and flows into the rotary compressor 30. The high-pressure refrigerant and the discharged refrigerant further gather with the refrigerant output from the rotary compressor 30 and are discharged from the gas discharge pipe 34b to the condenser 70. On the other hand, excess oil 13a in the oil storage cavity 33 returns to the rotary compressor 10 from the oil feeding pipe 28.

With the flowing of the high-pressure refrigerant above, some of the oil discharge from the rotary compressor 10 can be ensured in the rotary compressor 20, and some of the oil discharge from the rotary compressor 20 can be ensured in the rotary compressor 30. Therefore, compared with the prior arrangement in which the discharge from each of the rotary compressors flows directly to the condenser 70, the amount of oil discharge in the refrigeration cycle decreases.

On the other hand, the excess oil ensured in the rotary compressor 30 is supplied from the oil storage cavity 33 to the operating rotary compressor 10 automatically. That is, the amount of oil can be controlled among the three rotary compressors, so a suitable amount of oil can be retained in each of the compressors. Meanwhile, the amount oil discharge in the refrigeration cycle can be decreased. That is, the same effect with the first embodiment can be achieved in the second embodiment.

The oil feeding pipe 28 in FIG. 5 is omitted, and the oil separator 77 is provided between the gas discharge pipe 34b and the condenser 70, which is the method for the oil ensured in the oil separator 77 returning to the rotary compressor 10. The excess oil 13a ensured in the oil storage cavity 33 of the rotary compressor 30 does not return to the rotary compressor 10, therefore the amount of oil discharge coming from the gas discharge pipe 34b increases and can be ensured in the oil separator 77.

The oil ensured in the oil separator 77 returns to the low-pressure path 19 through the oil feeding pipe 74 (the dash lines), or returns to the rotary compressor 10 directly. The oil spray method illustrated in the first embodiment is used to make the oil return to the rotary compressor 10. The oil separator 77 can serve as a replacement of method disclosed in the first embodiment or the FIG. 4 of the second embodiment.

The second embodiment indicates that the same method with that of the first embodiment can also be used to connect the plurality of compressors even though the rotary compressors constituting the refrigeration cycle increases in amount and a same effect can be achieved. In addition, by means of the oil separator 77, the oil can return to the rotary compressor 10 in which the amount of oil decreases.

The Third Embodiment

Figure 6:
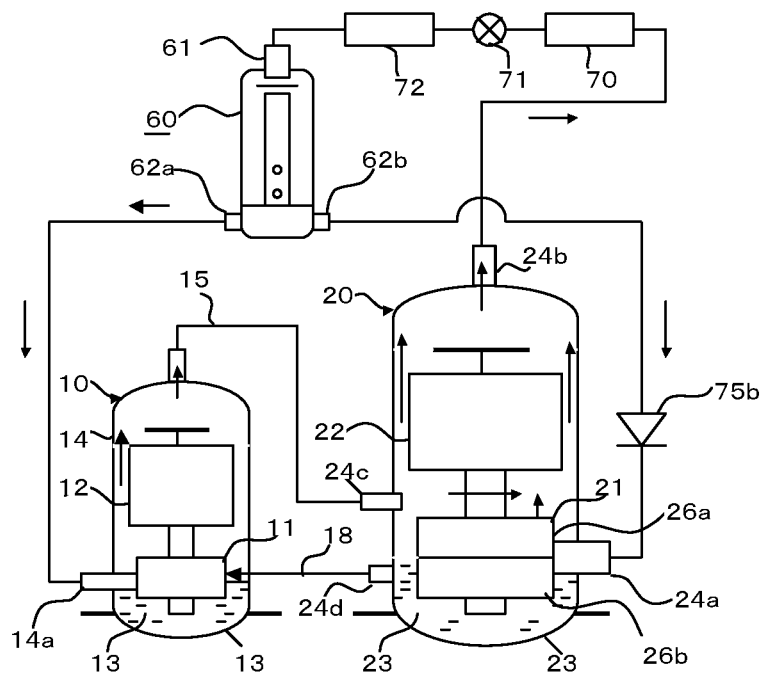
FIG. 6 is concerned with a third embodiment of the present disclosure and represents a refrigeration cycle related to a combination of a variable-frequency compressor and a capacity controllable compressor.

The third embodiment is a specific application example of the first embodiment or the second embodiment. In FIG. 6, the motor part 12 of the rotary compressor 10 is configured to be a variable-rotation-speed and variable-frequency motor part, and the capacity controllable compression mechanism part 21 with two-stage variable refrigeration-capacity is adopted in the rotary compressor 20.

The rotary compressor 10 has a minimum refrigeration capacity when the motor part 12 is at a minimum rotation speed, and has a maximum refrigeration capacity when the motor part 12 is at a maximum rotation speed. Herein, the minimum rotation speed and the maximum rotation speed are 10 rps and 120 rps respectively. The refrigeration capacity obtained herein is called a mode A. Namely the mode A means the refrigeration capacity variable based on the rotation speed.

The capacity-control compression mechanism part 21 may be achieved with the prior technology, for example, the content disclosed in patent literature 3 (CN201410046931.5). The rotary compressor in the patent literature 3 includes a pressure switch, one of sliding vane cavities of the compression mechanism part 21 is in a sealing state, and the pressure switch can make the pressure in the sealed sliding vane cavity switched between two different pressures so as to stop the compression or relieve the stop of the compression on a cylinder corresponding to that sealed sliding vane cavity.

The compression mechanism part 21 is constructed with two parts i.e. a first compression component 26a and a second compression component 26b and provided with a three way valve (not shown in the drawings) arranged in the exterior of the compressor. Three valve ports of the three way valve are connected with a sliding vane cavity of the second compression component 26b, a low-pressure environment (for example, a returning port or the low-pressure path) and a high-pressure environment (for example, space in the casing) respectively. During the operation of the rotary compressor 20, dormancy or releasing the dormancy of the cylinder is performed to the second compression component 26 under the control of the three way valve, and two stages of the refrigeration capacity can be switched by combining with the first compression component 26a which is active normally.

That is, if capacities of two cylinders are identical, the refrigeration capacity of the rotary compressor 20 can be switch between 50% of capacity and 100% of capacity. The operation modes are called mode B and mode C respectively. In addition, the capacity ratio could not only be 50:100, but further be designed as 20:100.

If the refrigeration capacity of the rotary compressor 10 at 120 rps is 6 KW, the minimum value (10 rps) of the refrigeration capacity of the operating rotary compressor 10 is 0.5 KW and the maximum value (120 rps) is 6 KW, which is mode A. On the other hand, the refrigeration capacity of the rotary compressor 20 is 6 KW in mode B, and 12 KW in mode C.

Figure 7:
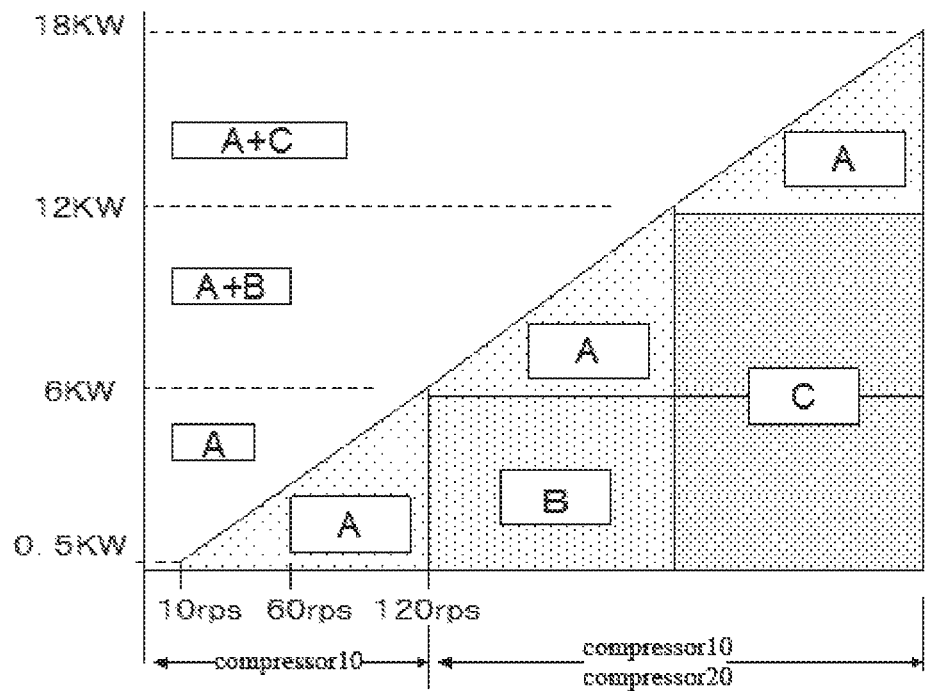
FIG. 7 is concerned with the third embodiment and represents a refrigerating capacity control diagram related to two compressors.

In FIG. 7, if only the rotary compressor 10 operates, the minimum value and the maximum value of the refrigeration capacity are 0.5 KW and 6 KW respectively, the refrigeration capacity ranges from 0.5 KW to 6 KW which is the range of mode A. Further, if the rotary compressor 20 operates in mode B, the minimum value and the maximum value are 0.5 KW and 12 KW respectively, the refrigeration capacity ranges from 0.5 KW to 12 KW which is the range of mode A+B. Further, if the rotary compressor 20 is switched into mode C, the minimum value and the maximum value are 12 KW and 18 KW, the refrigeration capacity ranges from 12 KW to 18 KW which is the range of mode A+C. That is, by means of the operation of the rotary compressor 10 and the rotary compressor 20, it is possible to realize a continuous and straight line type control of the refrigeration capacity from 0.5 KW to 18 KW.

Figure 8:
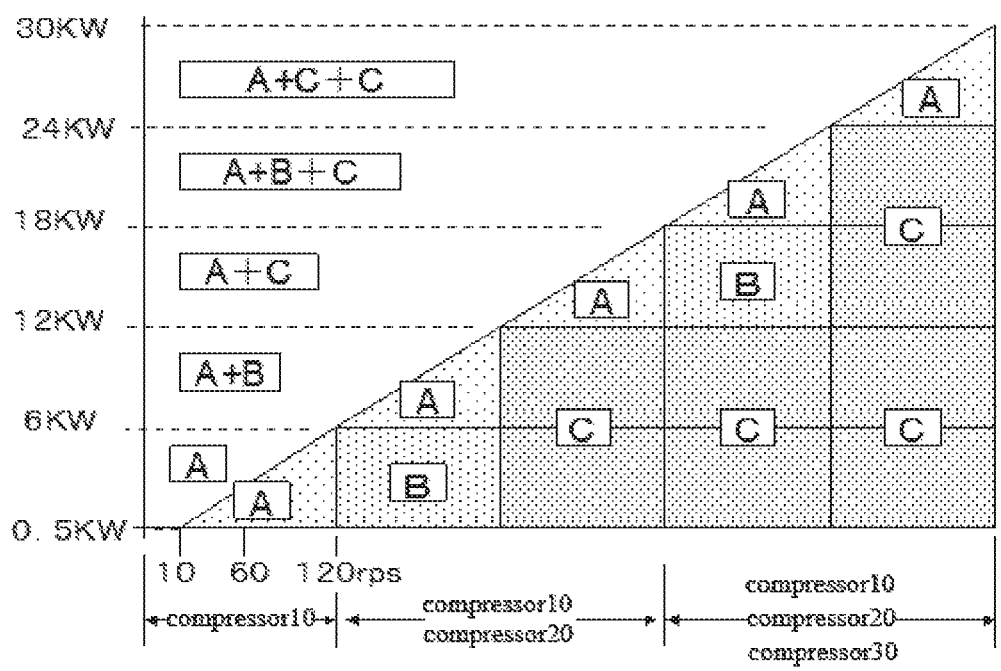
FIG. 8 is concerned with the third embodiment and represents a refrigerating capacity control diagram related to three compressors.

As shown in FIG. 8, if the rotary compressor 30 identical with the rotary compressor 20 is added, the maximum value of the refrigeration capacity is enlarged to 30 KW. In addition, the straight line type control of the refrigeration capacity can be performed from 0.5 KW to 30 KW.

With the combination of control of rotation speeds and capacities of two or three rotary compressors, for example, an air conditioning quality can be improved by an air conditioner. In addition, the comprehensive efficiency of the system can be maximized and meanwhile the reliability of the system is ensured.

The Fourth Embodiment

Figure 9:
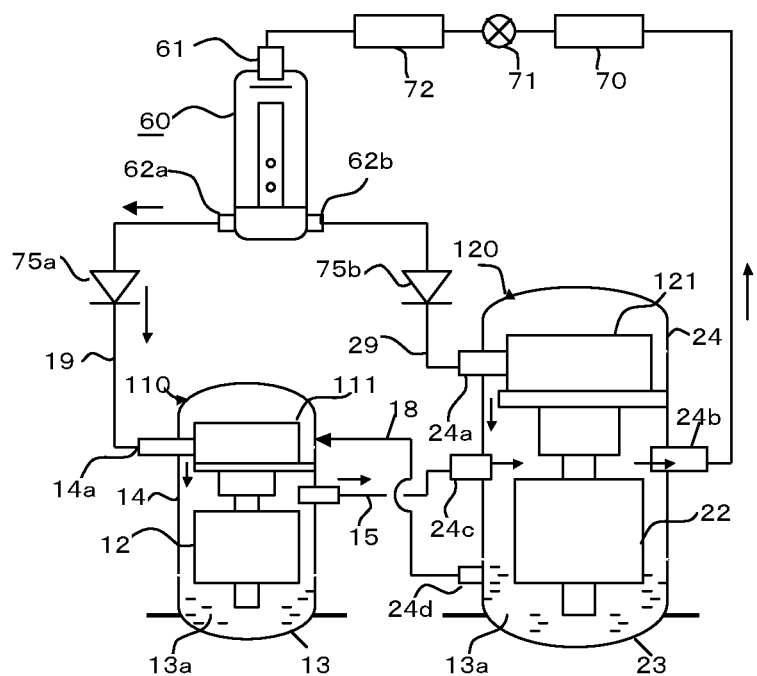
FIG. 9 is concerned with a fourth embodiment of the present disclosure and represents a refrigeration cycle device with a scroll compressor.

The refrigeration cycle device as well as the variable-refrigeration-capacity device applying to the refrigeration cycle device disclosed in first, second and third embodiments can not only be the rotary compressor, but also a scroll compressor of which the inner pressure in a sealed casing is in the high-pressure side. In FIG. 9, a compression mechanism part 111 and a motor part 12 are accommodated in a casing 24 of a scroll compressor 110, a compression mechanism part 121 and a motor part 22 are accommodated in a casing 24 of a scroll compressor 120. In addition, the oil 13a can be stored in an oil storage cavity 13 and an oil storage cavity 23 in the bottom part of the casing of each of the compressors.

Comparing the scroll compressor 110 and the scroll compressor 120 with the rotary compressor 10 and the rotary compressor 20, usually, the compression mechanism part is located in an upper side of the casing and the motor part is located in a lower side. Identical to the first embodiment, the gas discharge path 15 is located between them. A suction pipe 14a of a cylinder and a suction pipe 24a of a cylinder are connected with the compression mechanism part 111 and the compression mechanism part 121 respectively. A newly added connection pipe 24c is open towards a position between the compression mechanism part 121 and a stator core of the motor part 22.

Thus, the technology disclosed in the first embodiment, the second embodiment and the third embodiment even can be applied to the scroll compressor. In addition, the oil returning to the scroll compressor 110 performed by the oil feeding pipe 18 may also use the oil spay or air spray method disclosed in the description of the scroll compressor.

The refrigeration device having a plurality of rotary compressor of the present disclosure can be applied to air conditioners or the like. In addition, a continuous control of the refrigeration capacity can be performed by applying a variable-frequency compressor or a variable-capacity compressor.

In summary, the present disclosure seeks to solve the problems as follows: for multi-connected air conditioner including a plurality of compressors and a plurality of evaporators in rooms, the compressor starts or stops repeatedly because of variation of the air-conditioner load. Therefore, the amount of oil in each of the compressor increases or decreases, and a large amount of refrigerant condenses when the compressor stops at the low temperature. The compressor with a decreasing amount of oil easily goes wrong, and due to condensation of the refrigerant in the compressor, not only the refrigeration cycle performance is reduced, a large amount of oil is also discharged when the compressor starts again.

A specific means of the present disclosure to solve the above problems is as follows.

The high-temperature oil discharged from the first operating compressor is mixed with the refrigerant and flow through the second stopped or operating compressor. The oil separated in the second compressor is ensured in the oil storage cavity of the compressor and returns back the first compressor automatically. The temperature of the stopped second compressor rises, so the condensation of the refrigerant is prevented. On the other hand, the low-pressure refrigerant and oil flowing through the plurality of the evaporators are concentrated in one collective type accumulator, where the low-pressure refrigerant with an equalized superheat degree can be distributed to the operating compressor correctly. Therefore, the operating and stopped compressors both need to retain necessary amount of refrigerant and oil, preventing an excessiveness or deficiency.

The beneficial effects brought by the technical solutions above are as follow.

The plurality of the compressors can work like one assembled compressor no matter in operation or during stop. One collective type accumulator can perform the equalization of the superheat degree and distribution of the low-pressure refrigerant correctly. Therefore, the lubricating oil and the refrigerant circulating in the system are controlled simply and accurately, which can prevent a compressor from breaking down and a system efficiency from reducing.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In the present specification, the illustrative statement of the terms above is not necessarily referring to the same embodiment or example. Furthermore, the particular features, structures, materials, or characteristics described may be combined in any suitable manner in one or more embodiments or examples. In addition, different embodiments or examples, or features in different embodiments or examples described in the specification can be combined and united by those skilled in the art without contradictory circumstances.

Although embodiments of the present disclosure have been shown and described, it would be appreciated that the above embodiments are illustrative and cannot be construed to limit the present disclosure, and changes, alternatives, variations and modifications can be made to the embodiments by those skilled in the art within the scope of the present disclosure.

What is claimed is:

1. A refrigeration cycle device comprising:
a condenser,
an expansion valve,
an evaporator,
a collective accumulator having a liquid refrigerant reservoir portion and a gaseous refrigerant reservoir portion, and
three or more compressors, a sealed casing of each of the three or more compressors is provided with a compression mechanism and a motor configured to drive the compression mechanism, the motor is located above the compression mechanism, each of the three or more compressors is further provided with an oil storage cavity in a bottom part of the sealed casing,
wherein a first compressor of the three or more compressors includes:
a first suction inlet from a first low pressure path connecting the collective accumulator to the first suction inlet,
a first gas discharge port connected with the sealed casing of a second compressor of the three or more compressors through a first gas discharge path connecting the first and second compressors, and
a first oil port connected to a third oil port of a third compressor of the three or more compressors through an oil feeding path connecting the first oil port to the third oil port,
the second compressor includes:
a second suction inlet from a second low pressure path connecting the collective accumulator to the second suction inlet,
a second gas discharge port connected with the sealed casing of the third compressor of the three or more compressors through a second gas discharge path connecting the first and third compressors,
a first additional inlet connected to the first discharge port of the first compressor, the first additional inlet being arranged on the sealed casing of the second compressor at a position above the oil storage cavity of the second compressor such that when the second compressor is in an off state, gas discharged from the first compressor to the first additional inlet raises a temperature inside the sealed casing of the second compressor while the second compressor is not in use; and the third compressor includes:
a third suction inlet from a third low pressure path connecting the collective accumulator to the third suction inlet,
a third gas discharge port connected with the condenser,
the third oil port connected to the first oil port through the oil feeding path to share oil between the oil storage cavities of the first compressor and the third compressor, and
a second additional inlet connected to the second discharge port of the second compressor, the second additional inlet being arranged on the sealed casing of the third compressor at a position above the oil storage cavity of the third compressor such that when the third compressor is in an off state, gas discharged from the second compressor to the second additional inlet raises a temperature inside the sealed casing of the third compressor while the second compressor is not in use; and wherein:
the first compressor is configured such that a refrigeration capacity of the first compressor is variable;
the second compressor is configured such that a refrigeration capacity of the second compressor is variable;
the third compressor is configured such that a refrigeration capacity of the third compressor is variable;
the first compressor, the second compressor and the third compressor are controlled such that an overall refrigeration capacity of the refrigeration cycle device is variable in a linear relationship from a minimum to a maximum overall refrigeration capacity;
the first, second and last suction inlets of the three or more compressors, respectively, are each connected to the gaseous reservoir portion of the collective accumulator, and
a one-way valve is arranged in each of the first, second and third low pressure paths from the accumulator to the first, second and third suction inlets to selectively prevent flow of refrigerant from each of the first, second and third low pressure paths to the collective accumulator when one or more of the three or more compressors is in an off state.

2. The refrigeration cycle device according to claim 1, further comprising an oil separator connected with the low-pressure path or the sealed casing of one or more of the three or more compressors.

3. The refrigeration cycle device according to claim 1, wherein the collective accumulator is disposed between the evaporator and the first, second and third low pressure paths.

4. The refrigeration cycle device according to claim 1, wherein the motor of each of the three or more compressors comprises at least a stator core, a rotor core and a motor coil provided in the stator core, the inlet of the third compressor is open towards a region surrounded by the sealed casing, the compression mechanism part and the stator core of the third compressor.

5. The refrigeration cycle device according to claim 1, wherein the first compressor starts firstly.

6. The refrigeration cycle device according to claim 1, wherein at least one of the motors of the three or more compressors is configured to be a variable-rotation-speed and variable-frequency motor.

7. The refrigeration cycle device according to claim 1, wherein the expansion valve comprises a plurality of expansion valves and the evaporator comprises a plurality of evaporators.

8. The refrigeration cycle device according to claim 1, wherein the compression mechanism of each of the three or more compressors is configured as one of a rotary compression mechanism or a scroll compression mechanism.

9. The refrigeration cycle device according to claim 1, wherein the motor of each of the three or more compressors comprises an oil separation plate configured to rotate with a rotor of the motor.

* * * * *